(12) United States Patent
Caule

(10) Patent No.: US 8,333,438 B2
(45) Date of Patent: Dec. 18, 2012

(54) VENTILATED WHEEL ASSEMBLY

(75) Inventor: Patrice Caule, Colomiers (FR)

(73) Assignee: Technofan, Blagnac (FR)

( * ) Notice: Subject to any disclaimer, the term of this patent is extended or adjusted under 35 U.S.C. 154(b) by 69 days.

(21) Appl. No.: 12/683,683

(22) Filed: Jan. 7, 2010

(65) Prior Publication Data

US 2010/0187897 A1    Jul. 29, 2010

(30) Foreign Application Priority Data

Jan. 26, 2009  (FR) ...................... 09 50451

(51) Int. Cl.
*B60B 19/10*    (2006.01)
(52) U.S. Cl. .................. 301/6.3; 188/264 AA
(58) Field of Classification Search ............ 301/6.1–6.3; 188/264 A, 264 AA; 244/103 R, 103 S, 111; 192/113.23, 113.24

See application file for complete search history.

(56) References Cited

U.S. PATENT DOCUMENTS

| | | | |
|---|---|---|---|
| 3,251,437 A | 5/1966 | Moyer et al. | |
| 3,301,357 A | 1/1967 | Cussons et al. | |
| 3,734,247 A * | 5/1973 | Buckley | 188/264 A |
| 4,592,452 A * | 6/1986 | Merle | 188/264 AA |
| 4,620,616 A * | 11/1986 | Martin | 188/71.6 |
| 6,155,650 A * | 12/2000 | Barger | 301/6.3 |
| 6,578,678 B2 * | 6/2003 | Lee | 188/71.6 |
| 6,698,557 B2 * | 3/2004 | Hayes et al. | 188/264 AA |
| 2009/0152055 A1 * | 6/2009 | Cox | 188/71.6 |

FOREIGN PATENT DOCUMENTS

EP    1 547 812 A1    6/2005

* cited by examiner

*Primary Examiner* — Jason Bellinger
(74) *Attorney, Agent, or Firm* — Sughrue Mion, PLLC

(57) ABSTRACT

A wheel assembly including a wheel having an axis X-X' and a system for braking the wheel, in which a fan is arranged in order to cool the braking system. The rotor (14) of the fan is formed by a hub (20) and a plurality of blades (22) which rotate about the axis (X-X') of the wheel and has a wall (54). The rotor (14) of the fan comprises a rotating collar (24) which connects the outer radial ends of the blades (22), so that an operational clearance (56) is provided between the wall (54) of the air circulation channel (50) and the collar (24).

10 Claims, 4 Drawing Sheets

VENTILATED WHEEL ASSEMBLY

FIELD OF THE INVENTION

The present invention relates to a wheel assembly which comprises a wheel having an axis X-X' and a system for braking the wheel, in which a fan is arranged along the axis of the wheel in order to cool the braking system, the fan comprising a rotor which rotates about the axis X-X' and which is provided with a plurality of peripheral blades, the rotor being arranged in an air circulation channel which is delimited by an internal annular wall of the wheel so that an operational clearance is provided between the wall and the radial ends of the rotor.

BACKGROUND OF THE INVENTION

Wheel assemblies of this type are known in which fans are specifically dedicated to cooling the brakes of aircraft landing gear. These devices are necessary since the heat released by the brakes, in particular during landing, is significant and may present a risk to the integrity of the braking system. Furthermore, accelerated cooling of the brakes allows the plane to take off again within better timeframes, the brakes having to be kept below a specific temperature limit in order to prevent them from becoming broken during an emergency landing. The disadvantage of current cooling devices is that they are a significant source of noise.

Owing to mechanical and structural limitations, an operational clearance must be left between the radial end of the blades of the fan and the air circulation channel formed in the internal structure of the wheel, in which the fan is positioned. This operational clearance, referred to as "blade head clearance", is a source of noise, which is principally responsible for the increase in the noise level when the fans are used to cool the brakes in these assemblies. This source of noise is difficult to limit since mechanical and structural limitations require a significant clearance in particular in order to allow the significant clearance of the rotor during landing operations.

The object of the present invention is to provide a wheel assembly which produces a reduced level of noise.

SUMMARY OF THE INVENTION

To this end, the invention relates to a wheel assembly of the above-mentioned type, characterised in that the rotor of the fan comprises a collar which is arranged at the outer radial end of the blades of the rotor, and in that the operational clearance is provided between the internal annular wall of the air circulation channel and the collar.

Such a wheel assembly significantly reduces the noise caused by the operational clearance at the blade heads.

According to different features of the present invention:
the axial dimension of the collar along the axis X-X' is greater than the axial dimension of the blades along the same axis;
the collar extends at one side and the other of the blades along the axis (X-X');
a shroud is arranged against the rim of the wheel, and carries at the end remote from the rim a protection element, the channel for circulating air from the rim towards the outer side of the wheel being formed by at least one internal wall of the shroud and an internal wall of the protection element, the rotor being arranged in the air circulation channel so that the operational clearance is provided between the internal wall of the protection element and the collar;
the protection element comprises a protection grid which is formed by ribs and which is positioned so as to face, along the axis X-X', the blades of the rotor;
the shroud is formed by an external shell and a shroud support which extends inside the shell, the shroud support comprising an external crown and an internal crown, between which there is arranged an air passage, the internal crown of the shroud support being arranged in the continuation of the hub of the wheel;
the air circulation channel is delimited between an external wall and an internal wall, the external wall of the channel being formed successively along the axis X-X' by an internal wall of the shell, by the external crown of the shroud support and by the internal wall of the protection element, the internal wall of the channel being formed successively along the axis X-X' by the internal crown of the shroud support, and the skirt of the rotor;
the rotor of the fan is positioned in the air circulation channel, at an axial position such that the rotor is opposite the internal wall of the protection element and close to the protection grid;
the passage delimited by the internal crown and external crown extends precisely in continuation of the space which contains the blades and which is delimited between the skirt and the collar;
the ends of the passage delimited by the internal crown and external crown positioned opposite the skirt and the collar have tangents parallel with the axis X-X';
the rotor rotates at a rotation speed of approximately 3500 rpm.

The invention also relates to a ventilation device which is capable of being mounted on a wheel having an axis X-X' in order to obtain a wheel assembly as set out above, characterised in that the device comprises a shroud whose structure is reinforced by a shroud support, and a protection element which is fitted to the shroud, the external diameter of the protection element being capable of accommodating the rotor of the fan, and in that the operational clearance is provided between the collar of the rotor and the internal wall of the protection element.

The invention will now be described in greater detail, purely by way of non-limiting example, with reference to the appended Figures, in which:

DETAILED DESCRIPTION OF THE PREFERRED EMBODIMENT

Figure 1:
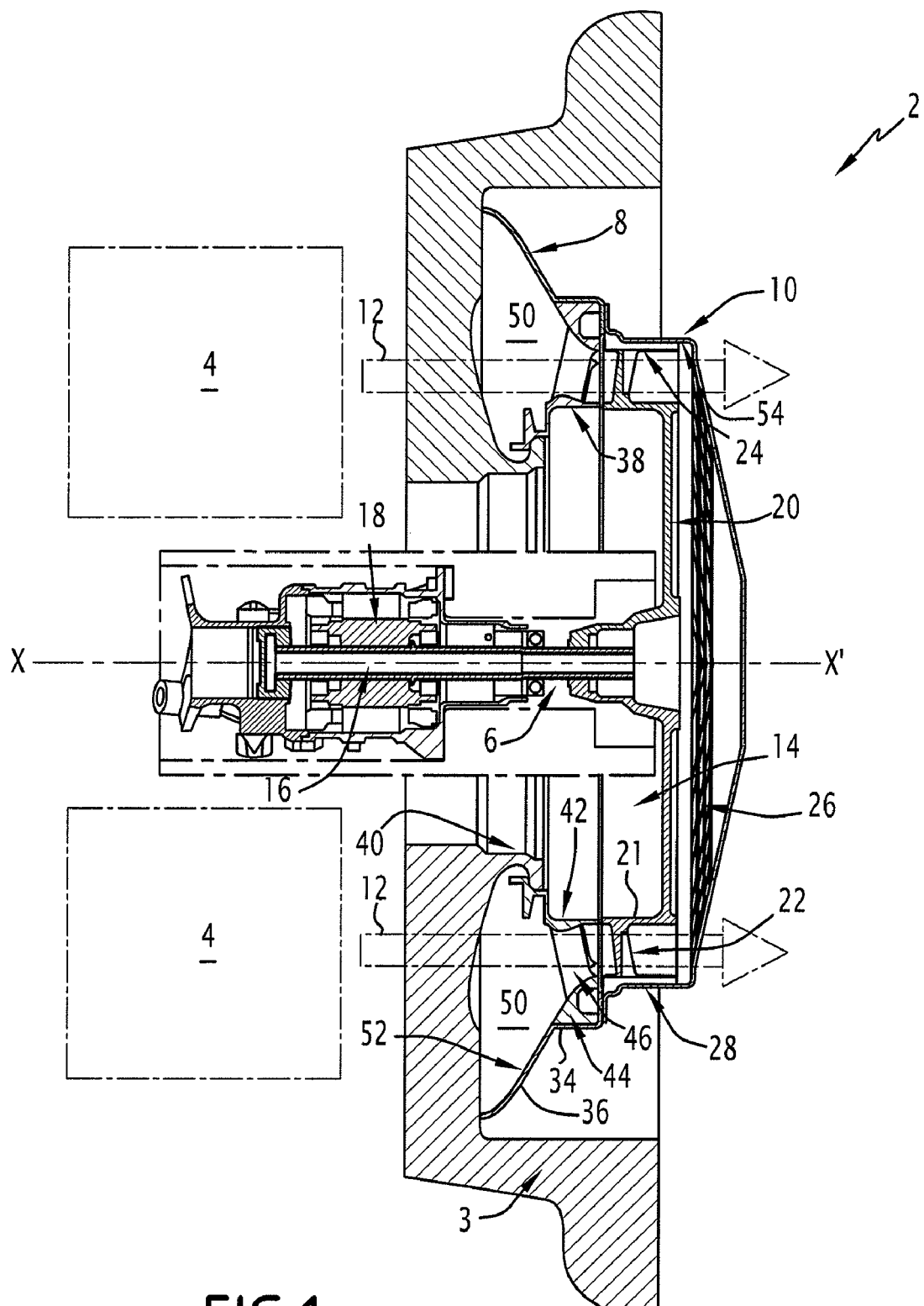
FIG. 1 is a longitudinal sectioned view of a wheel assembly according to the invention.

An aircraft landing gear comprises a plurality of wheels 2 having an axis X-X', which are subjected to stress principally during the landing and take-off phases of the aircraft. Each wheel 2 comprises at least one rim 3 on which a pneumatic tyre is mounted (not illustrated). A wheel assembly, as illustrated in FIG. 1, comprises a wheel 2, a braking system 4 for the wheel, and a ventilation device 5 for cooling the wheel comprising at least one fan 6 for cooling the braking system 4, a shroud 8 for guiding the flow of air and a protection element 10.

In known manner, the braking system comprises a hydraulic actuator, controlled by the action of the pilot on the brake pedal, this hydraulic actuator supplying a predetermined pressure to a set of brake discs, one portion of which is fixedly joined to the wheel. The pressure applied to these discs brakes the wheel. During this braking action, the kinetic energy of the aircraft is converted into heat and the heat released presents a risk for the landing gear.

The fan 6 is arranged along the axis of the wheel 2, in order to draw in a flow of hot air 12 from the braking system 4. The fan 6 is formed by a rotor 14, mounted on a drive shaft 16, the shaft extending coaxially relative to the axis X-X' of the wheel 2.

An electric motor 18 allows the rotation of the drive shaft 16 and the rotor 14 which is fixedly joined to the shaft 16. The motor 18 is connected to a control system which is not illustrated and which controls the starting and stopping of the motor in accordance with cooling requirements of the braking system 4.

Figure 2:
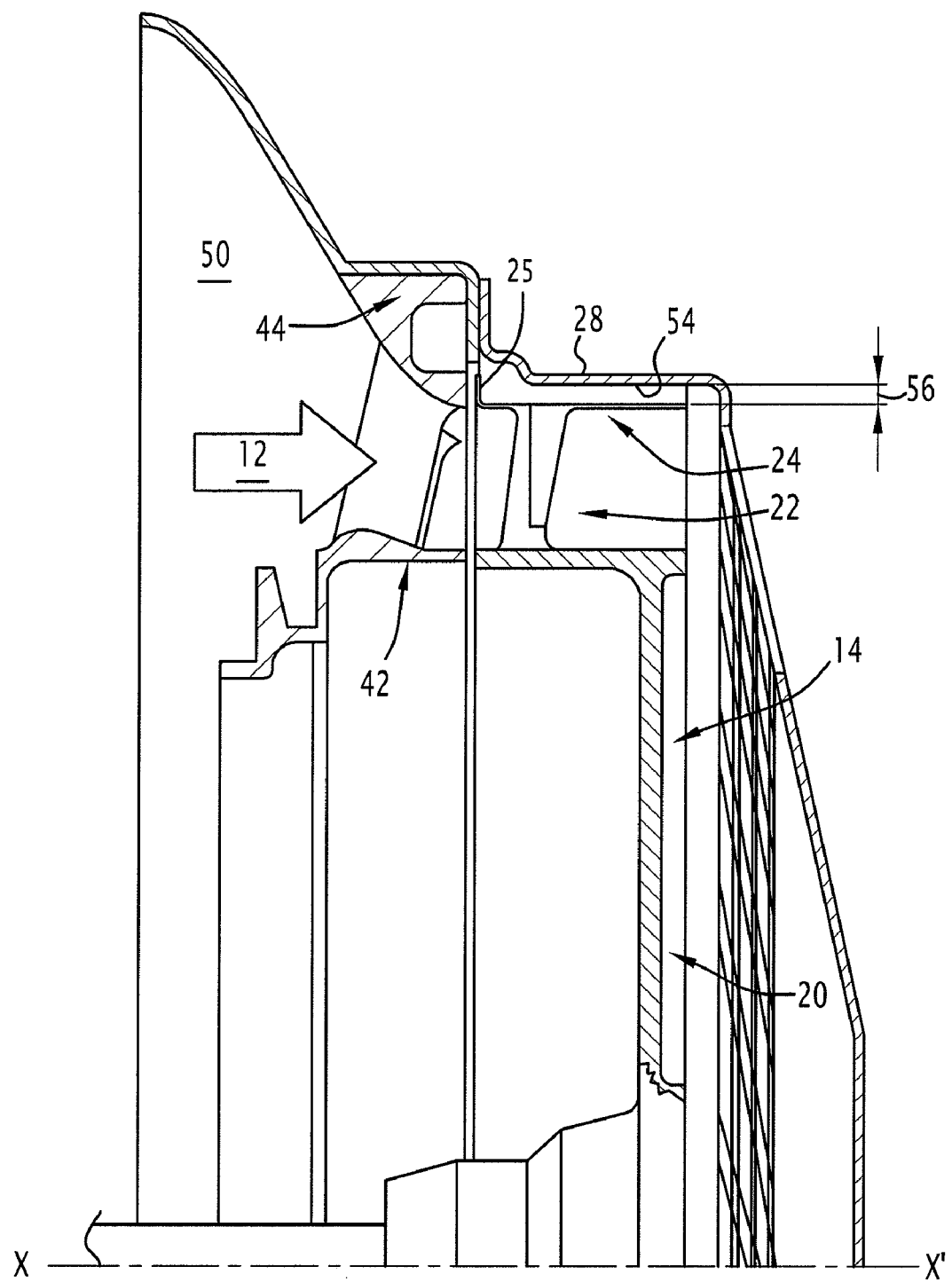
FIG. 2 is a longitudinal sectioned view of one half of the rotor, the protection element and the shroud, illustrated in FIG. 1.
Figure 3:
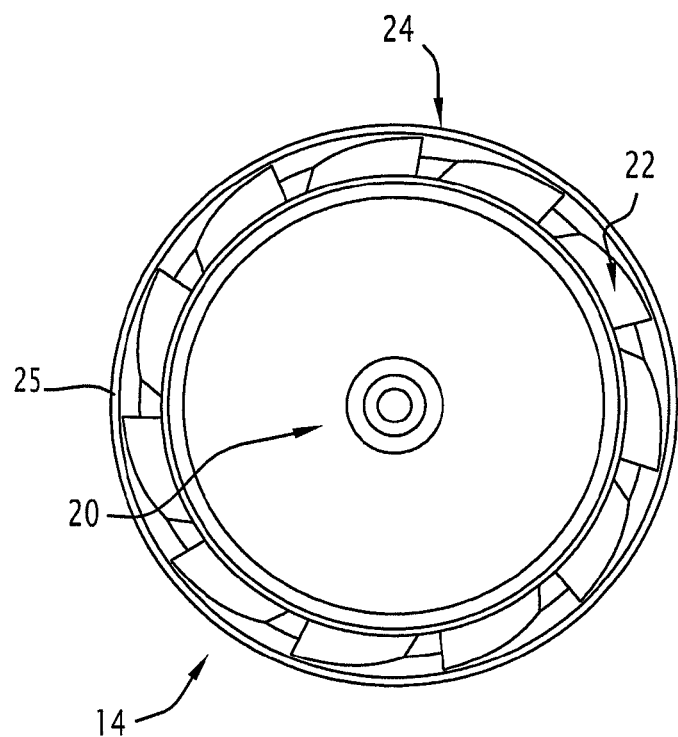
FIG. 3 is a front view of a rotor according to the invention.

As illustrated in FIGS. 2 and 3, the rotor 14 of the fan comprises according to the invention a central hub 20 having an axis X-X' which is bordered by a skirt 21 and a plurality of blades 22 which extend radially from the skirt 21 of the central hub 20. The rotor 14 of the fan comprises a collar 24 having an axis X-X' which connects the outer radial ends of the blades 22 together. The axial dimension of the collar 24 along the axis X-X' is greater than the axial dimension of a blade 22 along the same axis X-X' so that the collar 24 extends axially at one side and the other of the blades 22. The collar 24 carries at an axial end a flange 25 which extends radially, perpendicularly relative to the collar, and away from the central hub 20 of the rotor 14.

The protection element 10 is arranged towards the outer side of the wheel 2. The presence of this protection element 10 complies with safety restrictions in order to prevent external interference from being introduced into the wheel 2 and the fan 6. The protection element 10 is formed by a protection grid 26 which has a substantially circular shape which extends perpendicularly relative to the axis X-X' and whose radial end is extended axially towards the wheel 2 by a cylindrical channel 28 having an axis X-X'.

Figure 4:
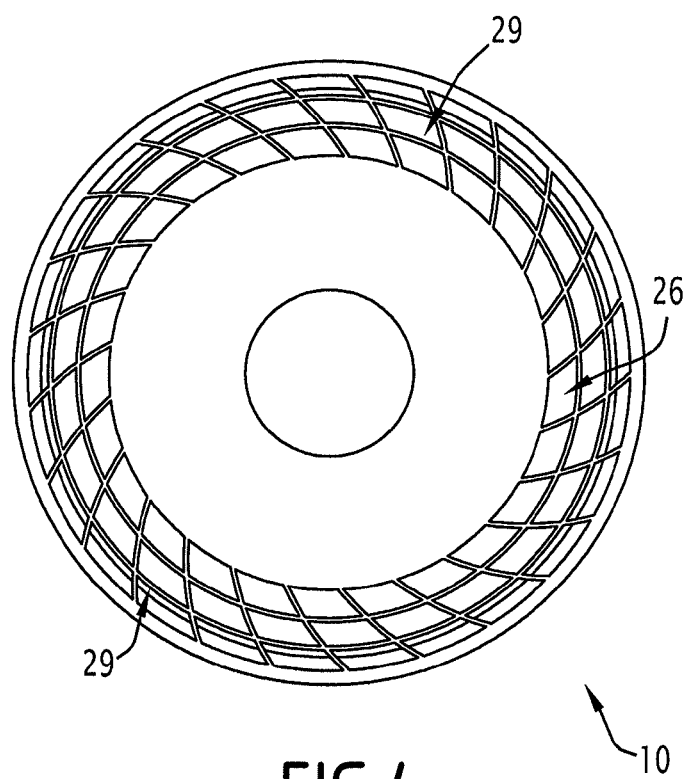
FIG. 4 is a front view of a protection grid according to the invention.
Figure 5:
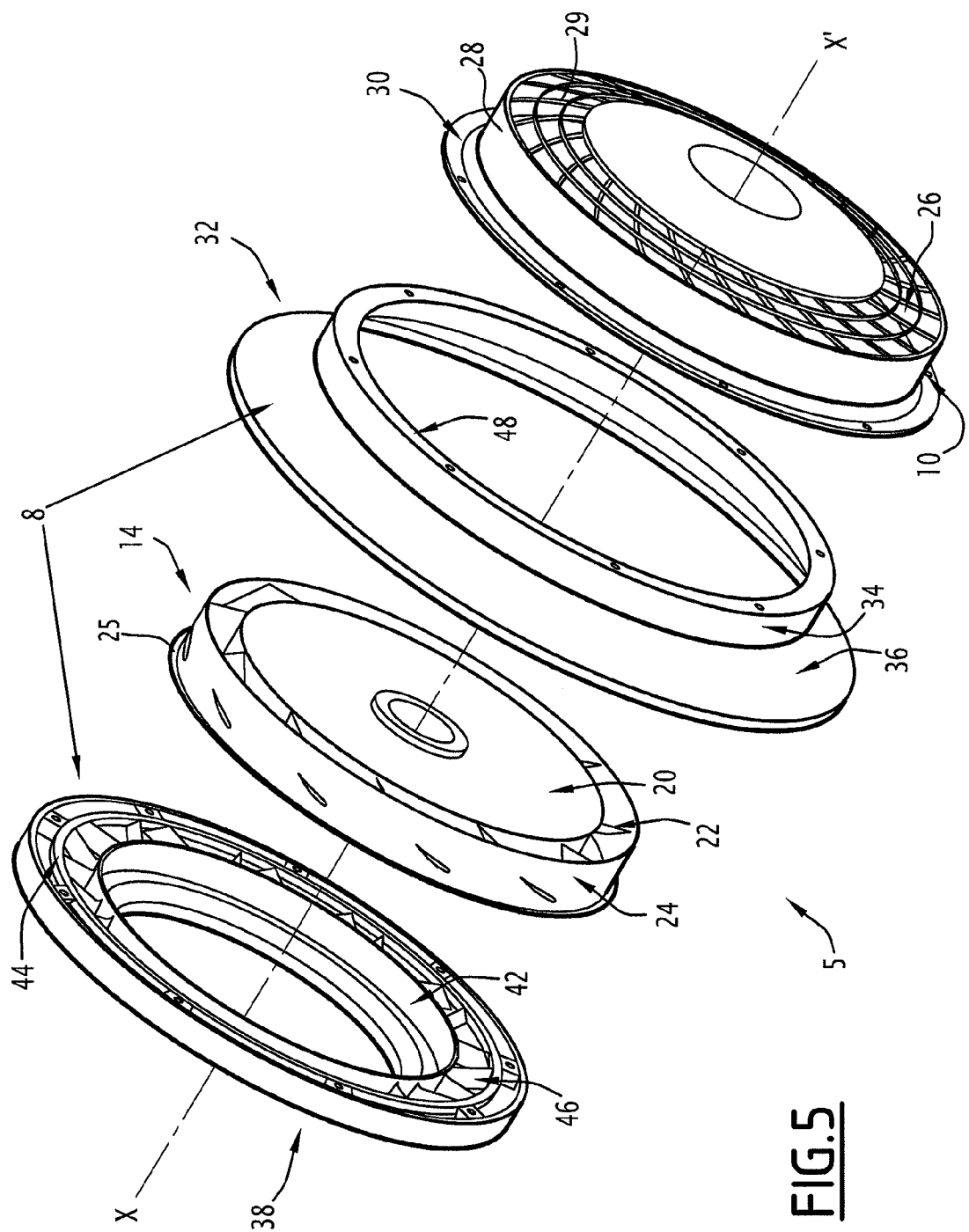
FIG. 5 is an exploded perspective view of the components of the wheel assembly of FIG. 1.

As illustrated in FIGS. 4 and 5, ribs 29 are arranged regularly in order to form the protection grid 26. These ribs 29 are formed remotely from the centre of the grid and are positioned so as to face, along the axis X-X', the blades 22, in continuation of the axial movement of the flow of air 12.

The cylindrical channel 28 carries at the axial end opposite the grid a raised edge 30 which is provided with fixing holes which are regularly spaced-apart on this raised edge 30. The raised edge 30 of the protection element 10 is capable of being positioned against the shroud 8.

The shroud 8 is arranged against the rim 3 in order to channel the air of the braking system 4 drawn in by the rotor 14, and to prevent external air from being drawn in by this rotor 14, which would impair the performance of the fan 6.

The shroud 8 is formed, as illustrated in FIG. 5, by an external shell 32 which comprises a first cylindrical portion 34 and a second flared portion 36, and a shroud support 38 which extends inside the external shell 32, in order to reinforce the shell 32 and guide the flow internally. The shroud 8 is positioned and fixed to the wheel 2 so that on the one hand the shroud support 38 is positioned in continuation of the wheel hub 40 and on the other hand the flared portion 36 of the shell 32 presses against the rim 3. The shroud 8 is fixedly joined to the rim 3 of the wheel and is arranged towards the outer side of the wheel 2 at the other side of the rim 3 compared with the braking system 4.

The shroud support 38 is formed by an internal crown 42 which is pressed against the wheel hub 40, and an external crown 44 which is concentric with the internal crown 42 and which has a larger diameter than the internal crown 42. Reinforcement ribs 46 radially connect these two crowns 42, 44 so that a passage is provided for the air between these two crowns.

The passage of air delimited by the internal crown 42 and external crown 44 extends precisely in continuation of the space which contains the blades 22 and which is delimited between the skirt 21 and the collar 24. The ends of the passage delimited by the internal crown 42 and external crown 44 positioned opposite the skirt 21 and the collar 24 have tangents parallel with the axis X-X'.

The free end of the first portion 34 of the shell 32 has a dropped edge 48. Fixing holes are regularly spaced-apart on this dropped edge 48, and on the external crown 44 of the shroud support 38. The shroud 8 and the protection element 10 are arranged so that the fixing holes correspond to and face each other, so that the protection element 10 can be fixed to the end of the shroud 8.

The shroud 8 forms an air circulation channel 50 which is delimited between an external wall and an internal wall. The external wall of the channel 50 is formed successively along the axis X-X' by an internal wall 52 of the shell 32, the external crown 44 of the shroud support 38 and an internal wall 54 of the cylindrical channel 28 of the protection element 10. The internal wall of the channel 50 is formed successively along the axis X-X' by the internal crown 42 of the shroud support 38 and the skirt 21 of the rotor 14.

The blades 22 of the rotor 14 of the fan 6 extend in the air circulation channel 50, at an axial position such that the blades 22 are opposite the internal wall 54 of the protection element 10 and close to the protection grid 26. The flange 25 carried by the collar 24 of the rotor 14 extends radially opposite the external crown 44 of the shroud support 38.

An operational clearance 56 is maintained between the walls which form the air circulation channel and the radial end of the rotor 14. According to the invention, and as illustrated in FIGS. 1 and 2, the operational clearance 56 is formed between, on the one hand, the collar 24 and, on the other hand, the internal wall 54 of the cylindrical channel 28 of the protection element 10 which forms a portion of the air circulation channel 50. This operational clearance 56 is constant over the entire axial dimension X-X' of this collar 2, this collar 24 extending substantially parallel with the internal wall 54 which forms part of the air circulation channel 50.

According to one embodiment of the invention, the second flared portion 36 of the shell 32 forming the shroud 8 has a diameter which is substantially equal to the internal diameter of the rim 3. The shroud 8 covers all of the air inlets from the braking system 4 which extend through the rim 3. The flow of air 12 is directed between the two crowns 42, 44 which form the shroud support 38. The flow of air flows in the channel 50 between the two crowns 42, 44 of the shroud support 38 then in the passage delimited between the collar 24 and the skirt 21 of the rotor 14.

The wheel assembly according to the invention is compact in the axial direction, and the position of the protection grid 26 is very close to the position of the rotor 14. This proximity of the protection grid 26 and the rotor 14 which may constitute a disadvantage in acoustic terms is controlled according to the invention by a protection grid 26 which is made as transparent as possible with respect to the air flow 12 in order to limit the interaction with the flow at the outlet of the rotor 14. The orientation, the inclination and the depth of the ribs 29 are determined in order to allow an optimal discharge of the air flow 12 from the fan 6.

The cooling of the brakes in a wheel assembly according to the invention is carried out in the following manner. After braking and excessive heating of the brakes, carried out in particular during a landing operation of the aircraft, data are provided for starting the electric motor 18, in order to bring about the rotation of the drive shaft 16 and the rotor 14 of the fan 6. The rotor 14, owing to the shape of the blades 22 which it comprises, draws in the hot air generated by the braking system 4 during the action of braking on the wheels 2.

The flow of hot air 12 moves from the inner side of the wheel to the outer side, so that it is discharged from the braking system 4, passes through the rim 3, then flows into the air circulation channel 50 which is formed in the space of the wheel 2, passes through the blades 22 of the rotor 14 of the fan 6, then passes through the protection grid 26 arranged opposite these blades 22 to then be discharged from the wheel assembly.

The present invention proposes the use of a fan rotor 14 which is provided with a collar 24. The flow of hot air 12 from the braking system 4 passes mainly though the blades 22 of this rotor 14, between the collar 24 and the central hub 20 of the rotor 14. The flange 25 extends radially in order to reduce the portion of the air flow which is capable of flowing via the passage between the collar 24 and the internal wall 54 of the cylindrical channel 28, provided for obtaining the operational clearance 56. The axial dimension of the collar 24 is greater than the axial dimension of a blade 22 and the collar 24 extends substantially parallel with the internal wall 54, so that disturbance of the air flow which flows via this clearance 56 is limited. The noise mechanism generated in known manner at the blade head is thus greatly reduced.

The diameter of the protection element 10 and the diameter of the rotor 14 of the fan allow an air circulation channel 50 to be provided in which the passage of the air flow delimited between the internal crown 42 and the external crown 44 of the shroud support 38 is arranged precisely opposite the space delimited between the skirt 21 and the collar 24 of the rotor 14. The air flow 12 thus drawn in passes primarily into this space, which is delimited between the skirt 21 and the collar 24 and which contains the blades 22. The path of the flow is not disturbed, and the passage of this flow through the blades of the rotor generates less noise.

The increase of the dimensions of the rotor and the protection grid is advantageously combined with a reduction of the rotation speed of the rotor. By way of example, a rotation speed of the rotor may, according to the invention, be in the region of 3500 rpm. This combination allows air to be drawn in through the rim of the pneumatic tyre, limiting the interaction energy between the rotor and the upstream disturbances. The speed reduction allows the rotor noise to be limited, depending on the intake conditions of the air flow.

The invention claimed is:

1. A wheel assembly which comprises a wheel (2) having an axis (X-X') and a system (4) for braking the wheel (2), in which a fan (6) is arranged along the axis of the wheel (2) in order to cool the braking system (4), the fan (6) comprising a rotor (14) which rotates about the axis (X-X') and which is provided with a plurality of peripheral blades (22), the rotor (14) being arranged in an air circulation channel (50) which is delimited by an internal annular wall (54) of the wheel (2) so that an operational clearance (56) is provided between the wall (54) and the radial ends of the rotor (14), wherein the rotor (14) of the fan (6) comprises a collar (24) which connects the outer radial ends of the blades (22) together, and wherein the operational clearance (56) is provided between the internal annular wall (54) of the air circulation channel (50) and the collar (24).

2. The wheel assembly according to claim 1, wherein a shroud (8) is arranged against the rim (3) of the wheel (2), and carries at an end remote from the rim (3) a protection element (10), the channel (50) for circulating air from the rim (3) towards the outer side of the wheel (2) being formed by at least one internal wall (52) of the shroud (8) and an internal wall (54) of the protection element (10), the rotor (14) being arranged in the air circulation channel (50) so that the operational clearance (56) is provided between the internal wall (54) of the protection element and the collar (24).

3. The wheel assembly according to claim 2, wherein the protection element (10) comprises a protection grid (26) which is formed by ribs (29) and which is positioned so as to face, along the axis (X-X'), the blades (22) of the rotor (14).

4. The wheel assembly according to claim 2, wherein the shroud (8) is formed by an external shell (32) and a shroud support (38) which extends inside the shell (32), the shroud support (38) comprising an external crown (44) and an internal crown (42), between which there is arranged an air passage, the internal crown (42) of the shroud support (38) being arranged in continuation of the hub (40) of the wheel.

5. The wheel assembly according to the claim 4, wherein the air circulation channel (50) is delimited between an external wall and an internal wall, the external wall of the channel (50) being formed successively along the axis (X-X') by an internal wall (52) of the shell (32), by the external crown (44) of the shroud support (38) and by the internal wall (54) of the protection element (10), the internal wall of the channel (50) being formed successively along the axis (X-X') by the internal crown (42) of the shroud support (38), and the skirt (21) of the rotor (14).

6. The wheel assembly according to claim 2, wherein the rotor (14) of the fan (6) is positioned in the air circulation channel (50), at an axial position such that the rotor (14) is opposite the internal wall (54) of the protection element (10).

7. The wheel assembly according to the claim 6, wherein the passage delimited by the internal crown (42) and external crown (44) extends in continuation of the space which contains the blades (22) and which is delimited between the skirt (21) and the collar (24).

8. The wheel assembly according to claim 7, wherein the ends of the passage delimited by the internal crown (42) and external crown (44) positioned opposite the skirt (21) and the collar (24) have tangents parallel with the axis (X-X').

9. The wheel assembly according to claim 1, wherein the rotor (14) is configured to rotate at a rotation speed of approximately 3500 rpm.

10. A ventilation device (5) which is capable of being mounted on a wheel (2) having an axis (X-X') in order to obtain a wheel assembly according to claim 2, wherein the device comprises a shroud (8) whose structure is reinforced by a shroud support (38), and a protection element (10) which is fitted to the shroud (8), the external diameter of the protection element (10) being capable of accommodating the rotor (14) of the fan (6), and in that the operational clearance (56) is provided between the collar (24) of the rotor (14) and the internal wall (54) of the protection element (10).

* * * * *